Jan. 18, 1966   M. KAPILOW   3,229,557
ADJUSTABLE BUTT SPLICER
Filed Dec. 10, 1963   3 Sheets-Sheet 1
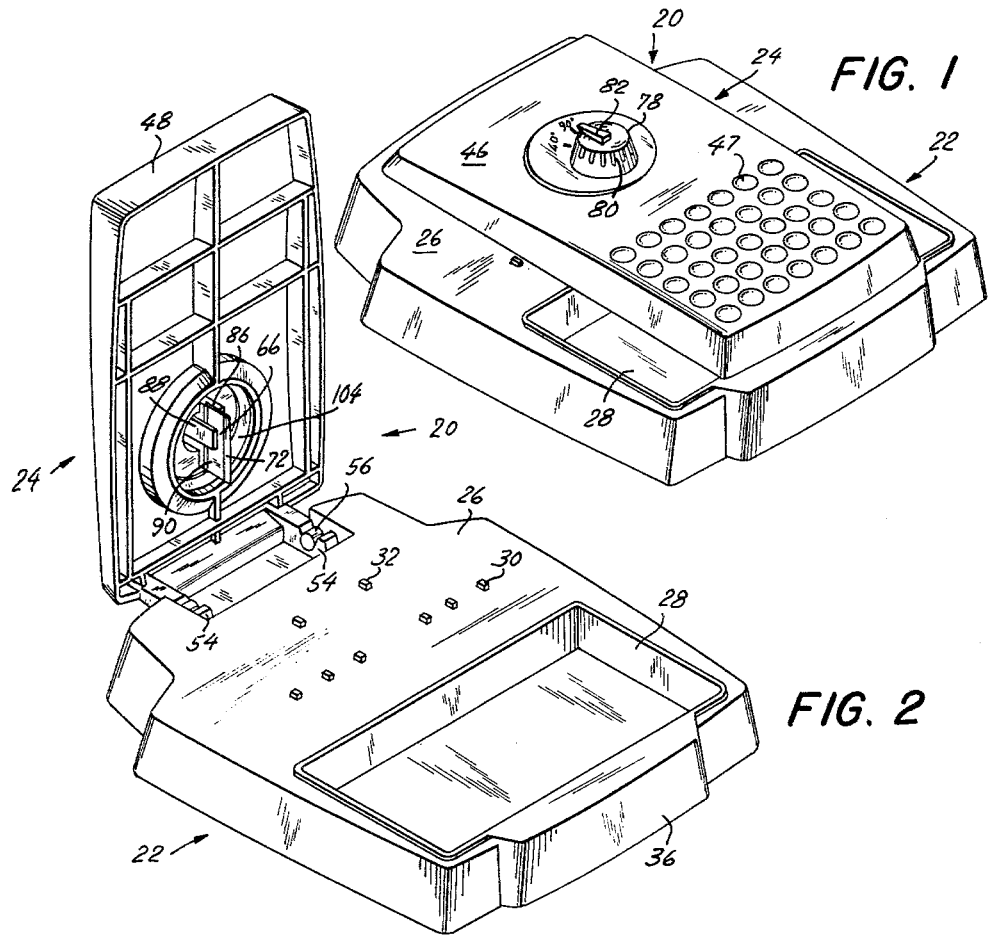
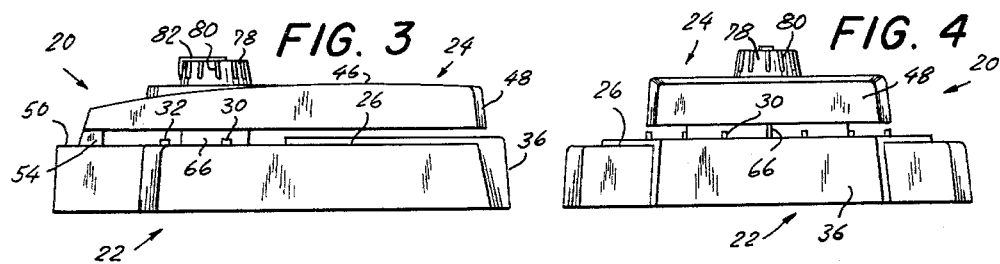
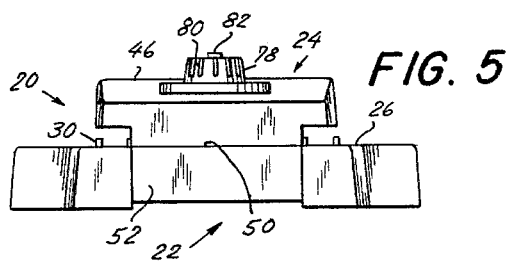
INVENTOR.
MARVIN KAPILOW
BY
Kane, Dalsimer & Kane
ATTORNEYS

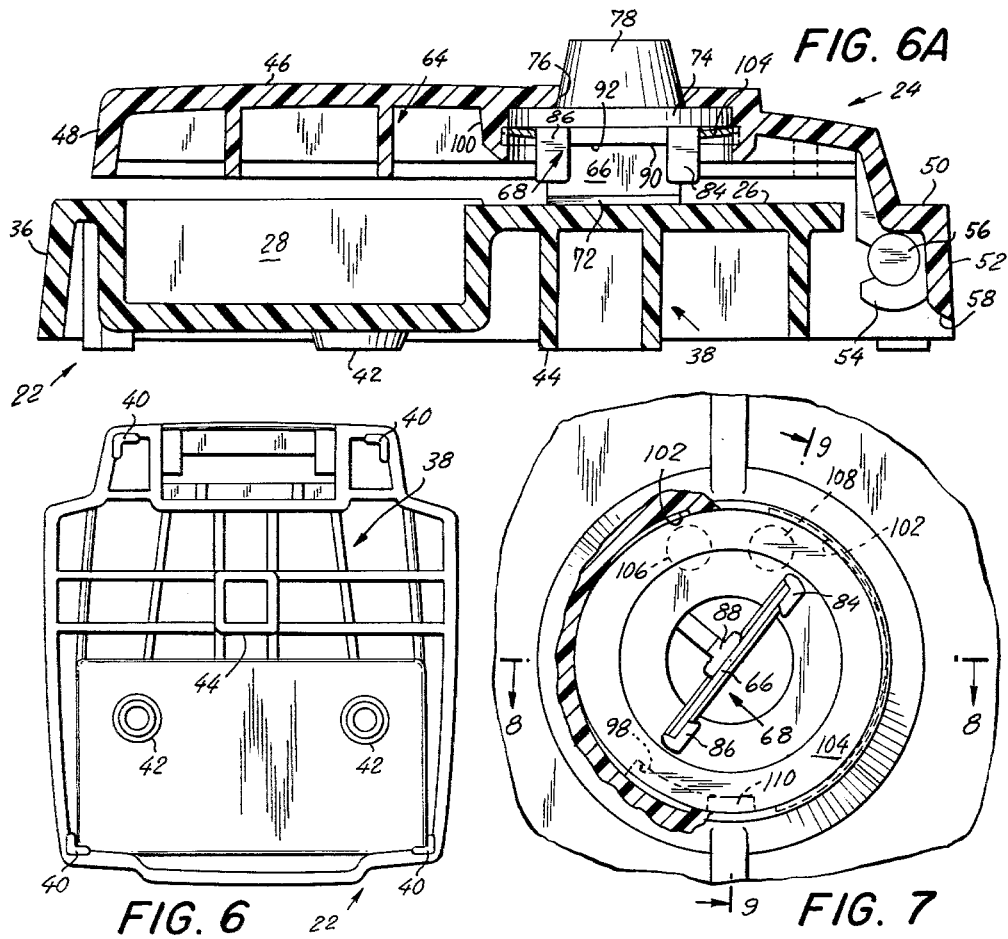
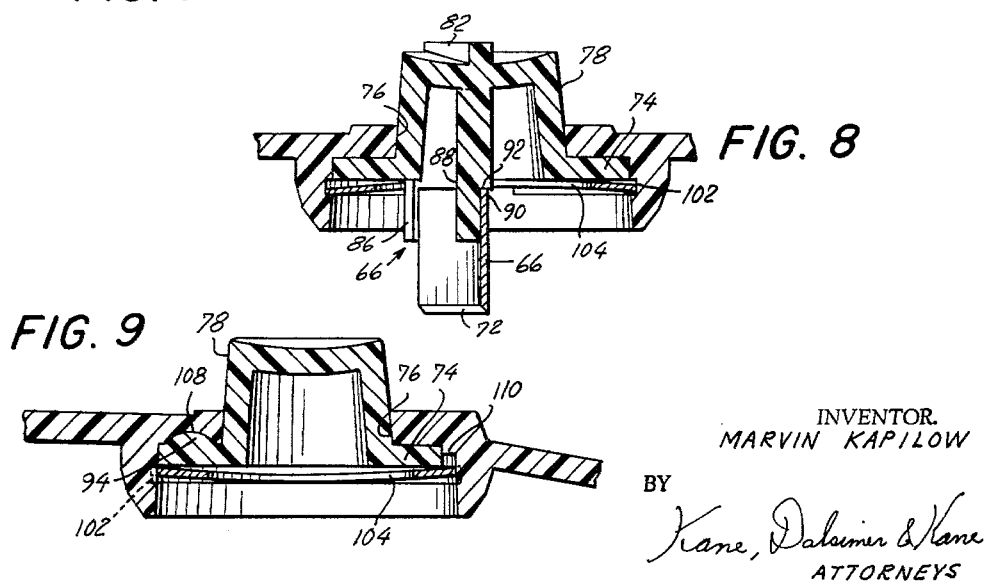

Jan. 18, 1966 M. KAPILOW 3,229,557
ADJUSTABLE BUTT SPLICER
Filed Dec. 10, 1963 3 Sheets-Sheet 3
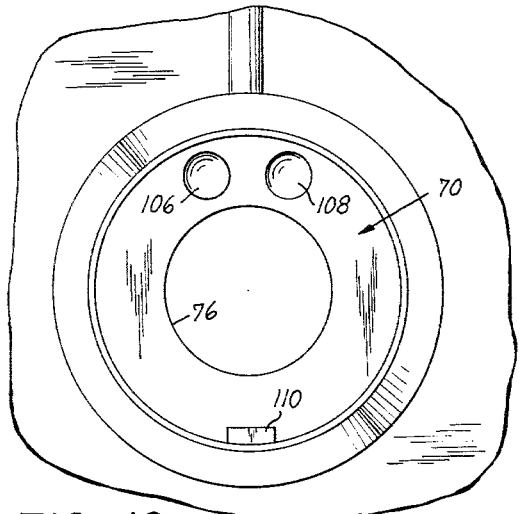
FIG. 10
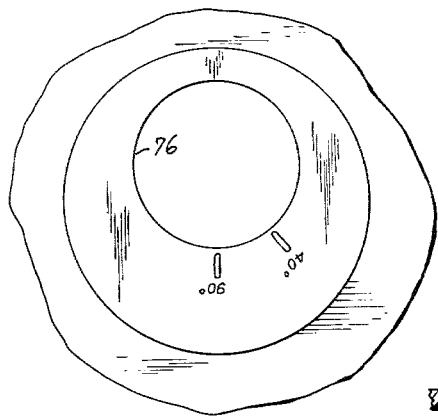
FIG. 11A
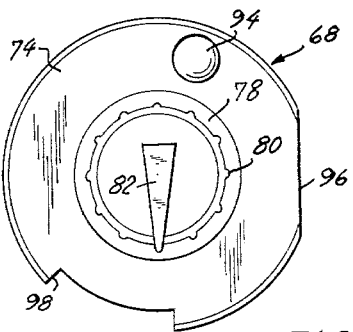
FIG. 11
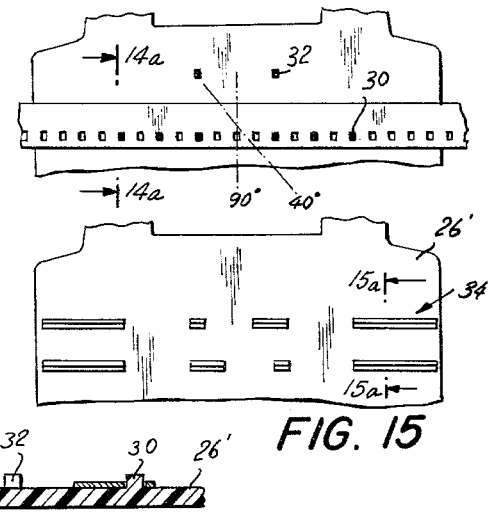
FIG. 14
FIG. 15
FIG. 15a
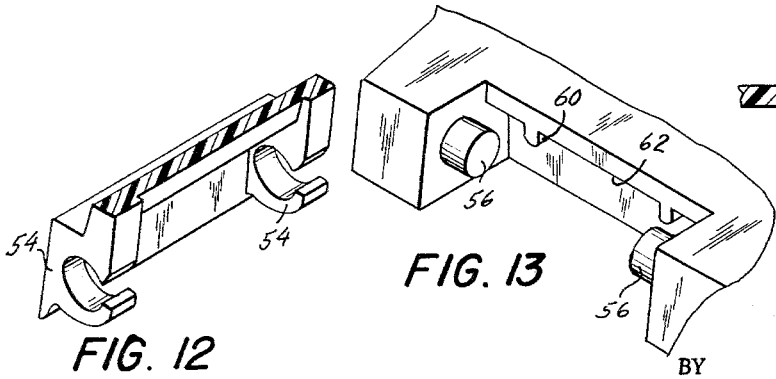
FIG. 12  FIG. 13
INVENTOR.
MARVIN KAPILOW
BY
Kane, Dalsimer & Kane
ATTORNEYS

United States Patent Office 3,229,557
Patented Jan. 18, 1966

3,229,557
ADJUSTABLE BUTT SPLICER
Marvin Kapilow, 8 Sound Road, Rye, N.Y.
Filed Dec. 10, 1963, Ser. No. 329,444
12 Claims. (Cl. 83—451)

This invention relates to improvements in splicers for film or tape and, more particularly, to a film or tape splicer provided with a selective and adjustable cutting edge.

In the art of splicing and editing motion picture film or magnetic sound tape, it is oftentimes desirable, if not necessary, to cut the ends of the film or tape to be spliced at a particular angle selected to best suit the intended purpose. In connection with motion picture film, some may prefer the straight cut (90° to the longitudinal axis of the film) because it has the advantage of being on the frame line and is invisible when it passes through the projector gate. The angle cut centrally of 0° to 90° to the longitudinal axis of the film may be dictated because the splice is slightly more rigid and the projector has a tendency to chatter or lose its loop. In connection with magnetic sound or recording tape, the straight cut is inevitably selected for precision editing whereas the angle cut may be employed in those cases when either rough or less critical editing is being performed. Most amateurs prefer the angle cut because it generates less noise than the straight cut.

It is, therefore, a principal object of this invention to provide a splicer having an adjustable cutting angle adapted to be selected to best suit the intended splicing purpose.

Another object is to provide an improved splicer of this type capable of positioning and trimming two lengths of film or tape and then butt splicing them together.

A further object is to provide such a splicer which is, in addition, relatively simple in construction, employs a relatively limited number of parts which are adapted to trim strips of film or tape to be spliced with a minimum of waste movement and retain such strips in splicing position during the securing operation; and, at the same time, a splicer is provided which may be readily manufactured by quantity production techniques and methods and one that is of such rugged character that it will function over long periods of time with freedom from substantially all difficulties.

A splicer of this invention will include a base from which extends projecting pins for engaging with the sprocket receiving openings in motion picture film or, on the other hand, projecting ribs for aligning magnetic tape. A pivotal arm extends from the base by means of an interposed pivotal connection providing relatively free but limited pivotal movement between these parts. A cutting blade is mounted by the arm and is so located and arranged with respect to the pins or ribs, as the case may be, of the base to be adapted to engage with the aligned and positioned film or tape on the base and trim the adjacent ends. This blade is provided with a rotatable mount which is coupled with the arm by means of a resilient means which, in the disclosed embodiment, is in the nature of a spring washer. Ball and detent means interposed between the mount and arm permit the placement of the cutting blade in a number of positions such that a butt splice may be formed with the abutting edges either normal to the side edges or longitudinal axis of the tape or film or at any angle with respect thereto.

Numerous other objects and advantages will become apparent from the following detailed description which is to be taken in conjunction with the accompanying drawings illustrating somewhat preferred embodiments of this invention and in which:

FIG. 1 is a perspective view of a splicer embodying the teachings of this invention with the arm bearing the cutting blade in a lowered position with respect to the mounting base;

FIG. 2 is a similar view with the arm in a raised or elevated position to expose the projectiong pins on the mounting base for motion picture film as well as splicing tape;

FIG. 3 is a side elevational view of the splicer with the arm lowered;

FIG. 4 is a front elevational view of the splicer in this position;

FIG. 5 is an end elevational view thereof;

FIG. 6 is a bottom plan view thereof;

FIG. 6A is a longitudinal sectional view taken along the line 6A—6A of FIG. 6;

FIG. 7 is an enlarged fragmentary view of the cutting blade as well as mount therefor together with associated portions of the supporting arm;

FIG. 8 is a cross sectional view taken along the line 8—8 of FIG. 7;

FIG. 9 is a sectional view taken along the line 9—9 of FIG. 7;

FIG. 10 is similar to FIG. 7 with the cutting blade and mount therefor removed from the arm to expose the cooperating parts of the support that receive the blade and mount therefor and provide for its selective adjustability;

FIG. 11 is a top plan view of the removed blade mount;

FIG. 11A is a top fragmentary view of the portion of the arm illustrated in FIG. 10;

FIG. 12 is a fragmentary perspective view of the pivotal end of the arm;

FIG. 13 is an enlarged fragmentary perspective view of the rear end of the base which cooperates with the arm in providing the pivotal interconnection therebetween;

FIG. 14 is a fragmentary top plan view of the top supporting face of the base which has upwardly projecting pins which are adapted to engage with the sprocket openings of motion picture film as well as splicing tape which serves to secure the ends of the film to be spliced;

FIG. 14A is a cross sectional view taken along the line 14A—14A of FIG. 14;

FIG. 15 is a fragmentary top plan view of the supporting top face of the base which has upwardly projecting ribs for positioning and aligning the tape to be spliced; and FIG. 15A is a cross sectional view taken along the line 15A—15A of FIG. 15.

Thus, a splicer 20 is illustrated in the drawings and includes a supporting base 22 to which a cutting edge mounting arm 24 is pivotally mounted. Referring initially to the details of the base 22, it will be observed that a top panel 26 is provided which includes a forward recessed tray or bin 28 of generally rectangular configuration for receiving and housing splicing tapes for securing the trimmed ends of the film or tape to be spliced. The top panel 26 also includes a series of aligned upwardly projecting ends 30 which are adapted to engage with the sprocket receiving openings of motion picture film for aligning the ends of the film to be spliced. A second series of aligned registration pins 32 are additionally provided on the top plate for purposes of engaging with correspondingly dimensioned openings in splicing tape or splice patches which may, for example, be of the type disclosed in U.S. Patent 2,969,106. In the event the splicer is particularly adapted for aligning, positioning and then facilitating the securement of magnetic sound tape, upwardly projecting interrupted ribs 34 are provided on the top panel 26 (see FIGS. 15 and 15A).

The base 22 is also provided with an apron extending downwardly from the periphery of the top panel 26. In addition, a network 38 of reinforcing and rigidifying ribs extend downwardly from the top panel between the peripheral apron 36 and tray 28 as clearly shown in FIG. 6. In order to reduce and minimize flexure of the base 22 during the splicing operation and maintain the splicer properly mounted on a supporting surface, the base 22 is provided with corner feet 40 as well as interior feet 42 and 44.

Referring now to the pivotal arm 24, it will be noted that a slightly curved or arcuate panel 46 extends across the top. The panel 46 may be provided with a series of recessed portions 47 or other equivalent means for purposes of providing a finger engaging portion during the splicing operation that will minimize the tendency of finger slippage. An apron 48 extends laterally from the periphery of the panel 46. The rear of the apron 48 is provided with a transverse extension 50 which terminates in a stop plate 52 which, together with the extension 50 and rear of the apron 48, present a pair of spaced journals adapted to receive inwardly extending pins 56 located at the rear of the stop plate 52 of the base 22. The terminal end 58 of the stop plate 52 is adapted to conveniently engage with downwardly extending ribs 60 of the extension 62 of the top plate 26 of the base 22 in determining the uppermost or raised position of the arm 24 relative to the mounting base 22. The interior of the arm 24 between the apron 48 is provided with a network 64 of strengthening ribs to once again minimize or reduce the extent of flexture of the arm and, particularly, the top panel 46 during the splicing operation.

The thusly provided pivotal connection is one which provides ready assembly of the arm 24 on the base 22 by simply snapping the journals 54 over the pins 56. This assembly is readily permitted when the parts are molded of a suitable synthetic resin possessing inherent flexibility and resiliency. A satisfactory and successful application of this invention employed high impact styrene for the moldable parts of of the splicer which, in the disclosed embodiments, excluded the cutting blade and resilient washer to be described. Naturally, other suitable materials can be employed individually or collectively as the desire or need arises and this invention is not limited to the use of any particular material.

A cutting blade 66 is advantageously suspended from the arm 24 in an adjustable manner to permit the desired as well as selected angle of trim of the film or tape to be spliced. In this connection, a blade mount 68 is associated with supporting means 70 of the arm 24 in such a manner that the mount 68 can be rotated relative to the support 70 to, accordingly, rotate the blade 66 a corresponding amount and thereby affect the angle of trim. The blade 66 may be essentially rectangular in configuration and include a lower sharpened edge 72. The blade may be selected from relatively hard and durable material such as a hard steel for example, of the type obtainable commercially under the name Korona Steel. Such steel blades will not wear as is the case with the regular and relatively soft steel razor blade type of splicers.

The blade mount 68 which, when formed from resinous material, may assume the form of a one-piece molded item. Under these circumstances, the mount will include a radial flange 74 from which extends in an upward direction through circular opening 76 in the arm 24 a generally frusto-conical finger gripping knob 78. This knob, in turn, may be provided with a series of ribs 80 as well as an indicator 82 which, as will be brought out shortly, serves to indicate the cutting angle of the blade 66. The blade 66 is firmly positionsd between the opposed end fingers 84 and 86 and the central finger 88 such that the blunt end 90 distal the cutting edge 72 rests against the bearing edge 92 extending from the flange 74. The flange is also provided with a raised portion 94 which functions as a ball of a ball and detent means for determining the angular disposition of the blade 66. The flange is also provided with a straight edge 96 parallel to the blade 66 as well as the major longitudinal axis of the indicator 82 to facilitate the accurate placement of the mount 68 on the arm 24 during the assembly operation. In addition, the flange is provided with a cutout sector 98 of preset length forming part of a stop means for limiting the extent of adjustability of the mount 68 and, consequently, the blade 66 relative to the arm 24.

Reference is now made to the support 70 for the mount 68 which serves to adjustably suspend the blade 66 from the arm 24 in a selective manner by cooperating to provide the ball and detent selection means and adjustment limiting means mentioned in the above as well as the function of securing the mount in this fashion to the arm 24. Thus, a downwardly extending substantially circular flange 100 extends laterally and inwardly of the panel 46 of the arm 24. The flange is provided with an interrupted circumferentially extending slot 102 which is adapted to receive the expanded peripheral edge of a washer capable of being resiliently biased on insertion between the inner confines of the flange 100 and then expanded into the interrupted slot 102. In this connection, either the opening defined by the flange or the periphery of the washer 104 may assume a slightly elliptical shape to facilitate this connection. Under the circumstances, the resilient washer will serve to hold the blade amount 68 in place with respect to the arm 24 between the flange 100. The washer 104, at the same time, permits rotation of the holder 68 and, consequently, the blade 66 relative to the support 70 under the resilient bias. In accordance with the illustrated embodiment, two adjustments of blade cutting angle are provided, a straight or 90° cut or an angle cut which, in a successful application of the invention, defined a 40° cutting angle. To accomplish this, the ball 94 of the ball and detent means is adapted to fall in either one of the pair of detents 106 for 90° or 108 for 40° trim angles. Naturally, the angle selected is variable depending upon the presetting of the location of the detents 106 and 108 relative to the ball 94. This selective adjustability is performed under the influence of the resilient bias provided by the spring washer 104.

To provide a stop means and thereby limit the extent of permissable rotation of the mount 68 and, consequently, the blade 66 relative to the support 70, a lateral projection 110 may extend radially inwardly of the flange 100 and, in this manner, be adapted to be disposed in the cutout portion 98 of the flange 74 of the mount 68. Accordingly, the permissable relative rotation of the parts is limited by this stop means.

Thus, a new concept in splicing film as well as tape is provided by this invention particularly 8 mm. movie film and magnetic recording tape commonly employed today. An adjustable cut film splicer is, according, contributed to the art to butt splice film on the frame line or diagonally at a 40° angle as in the disclosed embodiment, which is suited for sound film or for projectors which have a tendency to lose their loop. The angle of cut is adjustable merely by actuating the control knob 78 at the user's direction. The splicer is capable of handling 8 mm. film whether it be silent or provided with sound. A butt splice with little or no "show splices" is possible by cutting on the frame line. The cutting blade is substantially permanent when hard steel is employed as the blade material. The built-in storage compartment 28 permits rather handy storage of splice patches and tape. The splicer, in accordance with this invention, is compact enough to be stored inside a conventional movie projector case where it can be used during projection for emergenecy use.

In connection with the splicing of magnetic recording tape, the 90° and 40° cutting angles may still be employed. The only difference in the splicer construction would be in connection with the substitution of the ribs 34 for the projecting pins (see FIG. 15 and FIG. 15A). The 90° cut would be used for very critical editing whereby it would be used for very critical editing whereby it would be possible to edit out a single note. The 40° cut, on the other hand, would probably be preferred by most amateurs because it provides for less noise than the straight cut. This splicer has been successfully employed for mono, two-tract or four-tract recordings and is capable of being made to close tolerances allowing final tape editing to be done with a high degree of accuracy. A successful application of this invention has been directed to the splicing of ¼ inch wide magnetic sound tape. Splicing tape is available commercially for use with the splicer of this invention and is pretrimmed to exact length and width so that no post trimming of the splice is assembly. A nonbleed adhesive in a preferred form of splicing tape results in each precut piece of splice tape being protected by a peelable paper backing similar to common adhesive bandage strips so that the user need never touch the adhesive portion of the splice tape.

To use the splicer for purposes of splicing motion picture film and 8 mm. film, for example, the blade angle is initially selected by raising the cutting bar or arm 24 so that the blade 66 does not rest on the base 22. The blade control knob is then rotated to the desired setting as indicated by the indicator 82 with reference to the indicia provided on the arm 24 adjacent the opening 76 of the panel 46. While the cutting bar is raised, both film strips to be spliced are placed on the prongs or pins 30 with the sprocket holes facing the splicer user. The frame to be cut is centered between the two middle prongs assuring the emulsion or dull side of the film strips both face in the same direction. The cutting bar is then lowered or closed; and the user presses down on the finger engaging area of the arm 24 firmly to cut the film strips. The cutting bar is raised and the top waste piece of film is removed. A splice tape, obtainable commercially, particularly of the type specified in the above, with the aid of the upper locating prongs or pins 32 is then placed over the trimmed film. The adhesive liner is then removed to dispose the adhesively coated tape over the film. The splice is then rubbed; and the film is then turned over and replaced on the same prongs 30. The remaining paper flap or adhesive liner is removed and the tape folded over the film. The entire splice area is rubbed to assure permanent bond.

In connection with the splicing of recording tape, the desired blade angle is similarly selected by raising the cutting bar and rotating the adjusting knob until the arrow indicator 82 is at the desired setting. Both of the strips of the audio tape are snapped into the channel provided between the ribs 34. The strips should overlap at the center of the splicer where the blade cuts. The glossy side of both tape strips should face upwardly. The cutting bar is then lowered and pressed firmly to cut the tape. The cutting bar is then lifted and the waste piece of tape is removed. The splicing patch is then manipulated over the tape joint to secure the tape ends together after peeling off the paper flaps from the adhesively covered surface of the patch. The splice area is rubbed to insure permanent bond. To remove the spliced tape, both ends of the strips are held and pulled taut and snapped out of the groove between the ribs 34.

Thus, the several aforenoted objects and advantages, among others, are most effectively attained. Although several somewhat preferred embodiments of this invention have been disclosed herein, it should be understood that the invention is in no sense limited thereby; and its scope is to be determined by that of the appended claims.

I claim:

1. A splicer compriser: a base, positioning means on the base for positioning the material to be spliced; an arm; coupling means for coupling said arm to said base such that said arm is shiftable relative to said base between a raised position to a cutting position; a cutting blade; and adjustment means for adjustably coupling said blade to said arm such that the blade is adapted to cut the material to be spliced upon said arm being shifted to the cutting position, the adjustment means comprising a mount for holding said blade and a support on said arm for receiving said mount and connecting means for connecting said mount to said support such that said mount and blade are adapted to be rotated relative to said support to thereby cut the positioned material to be spliced at a selected angle, said support including a circular flange embracing said mount and said connecting means being a resilient washer biasing surfaces of said mount and support towards one another yet permitting relative rotation therebetween.

2. A splicer comprising: a base, positioning means on the base for positioning the material to be spliced; an arm; coupling means for coupling said arm to said base such that said arm is shiftable relative to said base between a raised position to a cutting position; a cutting blade; and adjustment means for adjustably coupling said blade to said arm such that the blade is adjusted to cut the material to be spliced upon said arm being shifted to the cutting position, the adjustment means comprising a mount for holding said blade and a support on said arm for receiving said mount and connecting means for connecting said mount to said support such that said mount and blade are adapted to be rotated relative to said support to thereby cut the positioned material to be spliced at a selected angle, and stop means being provided for limiting the extent of rotation of the mount relative to support.

3. A splicer comprising: a base, positioning means on the base for positioning the material to be spliced; an arm; coupling means for coupling said arm to said base such that said arm is shiftable relative to said base between a raised position to a cutting position; a cutting blade; and adjustment means for adjustably coupling said blade to said arm such that the blade is adapted to cut the material to be spliced upon said arm being shifted to the cutting position, the adjustment means comprising a mount for holding said blade and a support on said arm for receiving said mount and connecting means for connecting said mount to said support such that said mount and blade are adapted to be rotated relative to said support to thereby cut the positioned material to be spliced at a selected angle, portions of said mount projecting through said support away from said blade to present a finger gripping knob for turning the blade to the selected cutting angle.

4. A splicer comprising: a base, positioning means on the base for positioning the material to be spliced; an arm; coupling means for coupling said arm to said base such that said arm is shiftable relative to said base between a raised position to a cutting position; a cutting blade; and adjustment means for adjustably coupling said blade to said arm such that the blade is adapted to cut the material to be spliced upon said arm being shifted to the cutting position, the adjustment means comprising a mount for holding said blade and a support on said arm for receiving said mount and connecting means for connecting said mount to said support such that said mount and blade are adapted to be rotated relative to said support to thereby cut the positioned material to be spliced at a selected angle, said mount and support cooperating to present indicator means to indicate the angle of cut of the blade.

5. A splicer comprising: a base, positioning means on the base for positioning the material to be spliced; an arm; coupling means for coupling said arm to said base such that said arm is shiftable relative to said base between a raised position to a cutting position; a cutting blade; and adjustment means for adjustably coupling said blade to said arm such that the blade is adapted to cut the material to be spliced upon said arm being shifted to the cutting position, the adjustment means comprising a mount for holding said blade and a support on said arm for receiving said mount and connecting means for connecting said mount to said support such that said mount and blade are adapted to be rotated relative to said support to thereby cut the positioned material to be spliced at a selected angle, said support and mount cooperating to provide blade angle determining means for selectively and releasably fixing the cutting angle of the blade, said determining means including recesses and a mating projection shiftable in a selected predetermined manner with respect to one another to determine the blade cutting angle, and means for biasing said projection towards the recesses and permit the projection to be inserted in and removed from any of the recesses.

6. The invention in accordance with claim 5 wherein said base includes a compartment for housing splicing means.

7. The invention in accordance with claim 5 wherein said arm includes friction means for minimizing finger slippage upon shifting the arm to the cutting position.

8. The invention in accordance with claim 5 wherein the material to be spliced is motion picture film and the positioning means comprises aligned pins for engaging with the sprocket receiving openings of the film.

9. The invention in accordance with claim 4 wherein other pins are provided on the base for aligning a splice means relative to the film ends to be spliced.

10. The invention in accordance with claim 5 wherein the material to be spliced is sound tape and the positioning means comprises aligned interrupted ribs for engaging with the edges of the tape.

11. The invention in accordance with claim 5 wherein said coupling means comprises a pair of pins and a pair of slotted journals, said pins and journals being so constructed and arranged such that said pins are adapted to be snapped into said journals through said slots and expedite assembly of said arm on said base whereby said arm is pivotal from a raised position to a cutting position.

12. The invention in accordance with claim 11 wherein said arm and base present stop means for limiting the extent of pivotal movement of said arm to the raised position.

References Cited by the Examiner
UNITED STATES PATENTS

| | | | |
|---|---|---|---|
| 1,463,393 | 7/1923 | Heilman | 83—561 |
| 2,577,570 | 12/1951 | Eisenberg | 156—502 |
| 2,833,350 | 5/1958 | Merkur. | |
| 2,992,582 | 7/1961 | Castelli | 83—649 |
| 3,053,711 | 9/1962 | Eagle | 156—502 |

WILLIAM W. DYER, JR., *Primary Examiner.*